Figure 1:
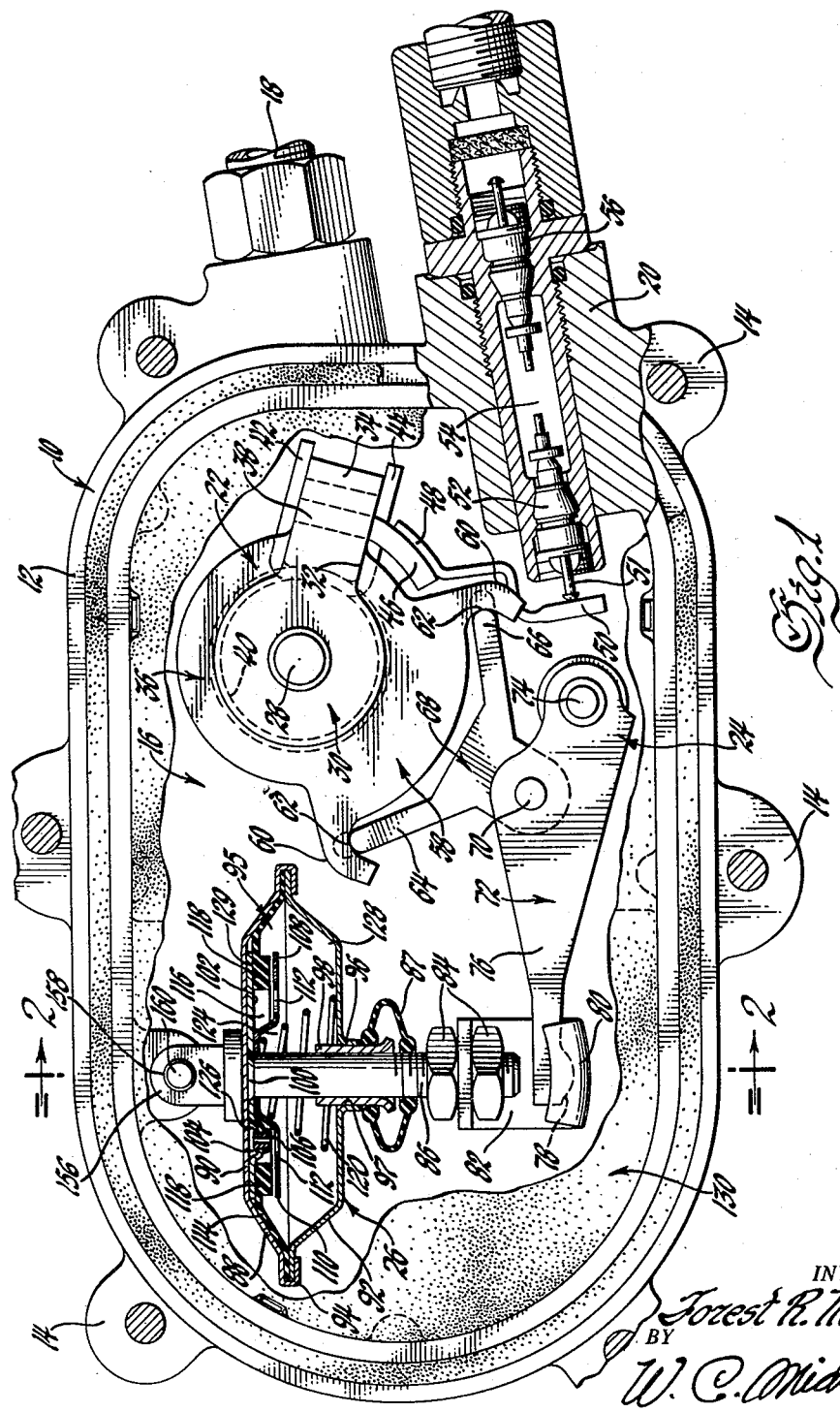

Dec. 6, 1960  F. R. McFARLAND  2,963,289
FLUID SUPPLY SYSTEM
Filed July 11, 1957  2 Sheets-Sheet 1

INVENTOR.
Forest R. McFarland
BY
W. C. Middleton
ATTORNEY

Dec. 6, 1960  F. R. McFARLAND  2,963,289
FLUID SUPPLY SYSTEM
Filed July 11, 1957  2 Sheets-Sheet 2

INVENTOR.
Forest R. McFarland
BY
W. C. Middleton
ATTORNEY

United States Patent Office 2,963,289
Patented Dec. 6, 1960

2,963,289

FLUID SUPPLY SYSTEM

Forest R. McFarland, Flint, Mich., assignor to General Motors Corporation, Detroit, Mich., a corporation of Delaware Filed July 11, 1957, Ser. No. 671,255

5 Claims. (Cl. 267—65)

This invention relates to a dash-pot fluid supply system.

With the increased use in motor vehicles of air spring suspension systems replacing the conventional leaf springs and/or aircraft shock absorbers, some means is usually provided for controlling the supply or exhaust of air from the air springs following a displacement of the sprung mass from the unsprung mass of the vehicle occasioned by the vehicle traveling over a bump, depression or rounding a curve. This control device may consist of a retarding mechanism to retard actuation of the valves upon momentary normal oscillations of the wheel while permitting actuation to supply air to or exhaust air from the springs upon a maintained displacement of the sprung mass from the unsprung mass, such as, for instance, would occur with the driver and/or passengers entering or leaving the vehicle. If the fluid medium used in the springs is air, an air compressor is generally provided connecting with the conduit leading to the supply valve. In most cases, a dash-pot is contained within the valve housing and receives its supply of air from the air in the housing. However, since oil is used for lubricating the compressor, occasionally a very fine vapor of oil may become intermixed with the high pressure air delivered to the chamber in the valve housing. Since the dash-pot usually comprises a diaphragm having an orifice controlling the movement of air to opposite sides of the diaphragm, small particles of oil may collect at the orifice, contaminating the same and thereby decreasing the size of the orifice to change the action of the dash-pot. This is very objectionable when the vehicle is rounding a curve, for instance, because displacement between the sprung and unsprung mass signals for the supply or exhaust of air to the air springs, and it is then necessary that the dash-pot be accurately timed so that the valve control mechanism can be effective only for a controlled period of time. If this were not true, the vehicle may be proceeding very rapidly into and out of turns, such as an S turn, with the dash-pot mechanism failing to function properly, thereby maintaining the vehicle at an undesirable attitude, i.e., one side of the vehicle would be at an undesirable height with relation to the other side and the angle of the turn.

Therefore, it is an object of this invention to provide a separate air supply source for the dash-pot to prevent contamination of the dash-pot orifice means with foreign matter, thereby permitting the dash-pot to always operate in the manner for which it was designed.

It is another object of this invention to provide a closed fluid system for the supply of air to a dash-pot, the source of fluid pressure comprising a container constructed with deformable walls to permit the air in the dash-pot to be of an equal pressure with the outside air surrounding the dash-pot to prevent intermixing of the two.

It is a further object of this invention to provide a sealed fluid supply system for a dash-pot, the fluid pressure within the system capable of being varied in accordance with the variation in pressure existing outside the system, in order to provide equal pressures inside and outside the system thereby preventing the movement of foreign matter into the system.

Figure 2:
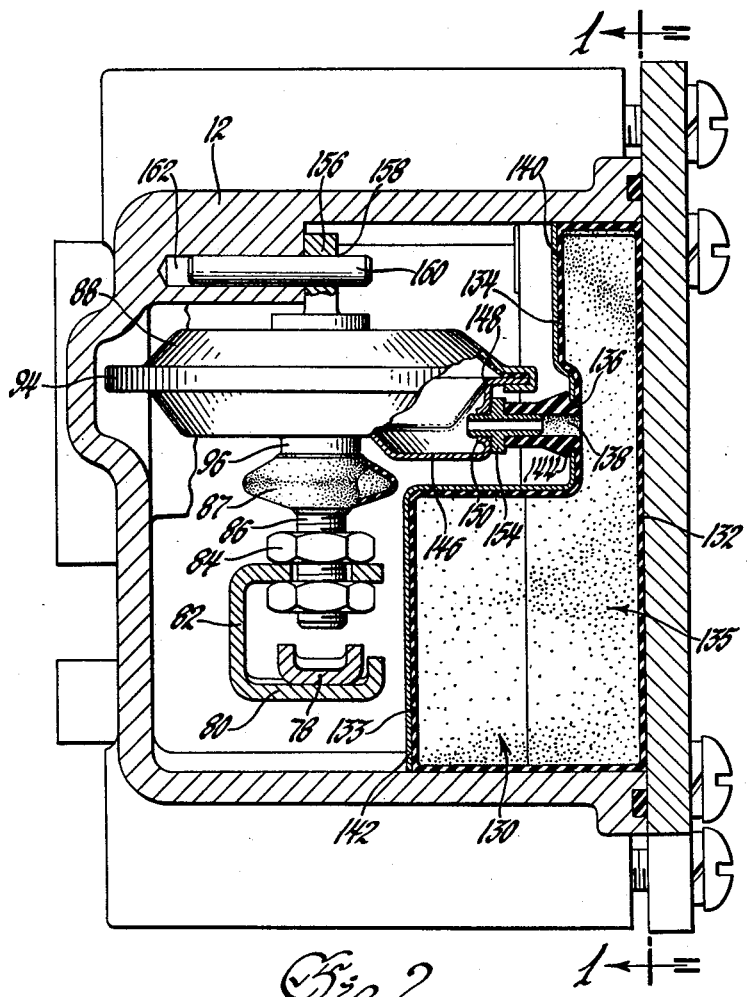

Other features, advantages and objects will become apparent by reference to the detailed description of the invention and to the drawings wherein:

Figure 1 is a cross-sectional view of a dash-pot and its operating mechanism as seen in the direction of arrows 1—1 of Figure 2, and Figure 2 is a side elevational partial cross-sectional view of the dash-pot of Figure 1 together with the details of its air supply system.

Referring now to the drawings and more particularly to Figure 1, wherein there is shown an air valve controlling mechanism 10 having a housing 12 adapted to be connected by means of ears 14 to a suitable point on the sprung mass (not shown) of the vehicle system adjacent the air chamber (not shown) communicating with the air springs (not shown). The confines of housing 12 define an air chamber 16 connected to the air in the air springs by means of a conduit or pipe 18. Positioned also in housing 12 are the air intake and exhaust valves (exhaust valves not shown) in a housing 20 adapted to be actuated by a lever mechanism 22 having a connection by means of a reciprocating lever 24 to a dash-pot retarding means 26, which is the subject of this invention.

Referring more particularly to the details of this actuating mechanism, within the housing 12 is shown a shaft 28 adapted to be rotated upon the displacement of the sprung mass with respect to the unsprung mass of the vehicle. Splined to this shaft is a first lever 30 having a lateral portion 32 and a portion 34 extending parallel to shaft 28. Rotatably journalled on shaft 28 is a second lever 36 also having a portion 38 parallel to drive shaft 28. Yieldably connecting these two levers is a coiled torsion spring 40 having one end 42 abutting the edges of parallel portions 38 and 34 of levers 36 and 30, respectively, with the other end 44 abutting the opposite edges of parallel portions 38 and 34 of levers 36 and 30, respectively. In this manner, rotation of shaft 28 and lever 30 will transmit a rotation to lever 36 by means of torsion spring 40, or if rotation of lever 36 is retarded, relative rotation between the two levers will be permitted. Attached to an extended portion 46 of the parallel portion 38 of lever 36 is a thin valve actuating plate 48 of irregular configuration having a flange 50 adapted to abut the stem 51 of a conventional spring closed tire valve 52 constituting an intake valve controlling the supply of air from a high pressure source (not shown) through a conduit 54. A check valve 56 is also provided in conduit 54 normally opened by the pressure from the high pressure source but adapted to be closed by pressure from chamber 16 in the event that this later pressure becomes high enough to open intake valve 52 at a time when it is not called for by movement of flange 50.

Also formed integrally with secondary lever 36 is a bell-shaped portion 58 having rounded spaced end portions 60 formed with recesses or pockets 62 adapted to be engaged by the legs 64 and 66 of a substantially triangularly-shaped link or lever 68 having a pivotal connection at 70 with a dash-pot operating lever 72. Lever 72 is pivoted at one end at 74 to a stationary portion of the housing, with its other end 76 being formed with a nipple 78 adapted to engage a suitably curved receiving portion 80 of a generally U-shaped member 82 attached by means of nuts 84 to a dash-pot reciprocating plunger 86.

With this particular construction of the bell-shaped portion 58 and the link 68 pivoted to the lever 72, pockets 62 are adapted to act as force points so that upon rotation of lever 36 in either direction from a neutral position as shown, lever 72 will be moved downwardly from the position shown, thus giving this lever a uni-directional operating stroke and a return stroke. Return movement of the lever 36 to its neutral position will, of course, return the lever 72 to its neutral position.

The dash-pot 26 comprises a housing 88 consisting of two parts 90 and 92 secured together at 94 to define an air chamber 95. The side 92 of the housing is formed medially with flange portions 96 defining an opening 97 through which the plunger 86 extends. A sleeve 98 is suitably positioned within the opening 97 between the housing side 92 and the plunger 86 to permit sliding movement of the plunger relative to the housing. An annular rubber-like seal 87 is provided abutting the edges of flanges 96, the sleeve 98 and the tubular shaft 86 to normally prevent the leakage of air between the chamber 95 and chamber 16. Attached or fixed to the end 100 of the plunger in the air chamber 95 is a thin metallic annular plate or flange 102 shaped to abut the side 90 of the housing. Suitably fixed in an opening 104 in flange 102 is a flexible orifice 106. Also fixed to the end 100 of plunger 86 is a second metallic annular flange or plate 108 having its outer peripheral portions 110 offset or spaced axially from the outer peripheral portions of flange 102 and being provided with openings 112 for the passage of air therethrough. Suitably fixed to the housing 88 at 94 is a flexible annular rubber-like diaphragm member 114 being centrally apertured at 116 and enlarged at 118 to form an engaging surface for cooperation with either of the first or second flanges. The diaphragm 114 in cooperation with flanges 102 and 108 acts to divide the chamber 95 into two compartments 126 and 128 for regulating the motion of plunger 86. This diaphragm 114 is pre-stressed to normally be pressed against the primary or first flange member 102 but is capable of being moved to abutting relationship with the outer portion 110 of the secondary flange 108 upon upward motion of plate 102, thereby compressing the fluid present in compartment 126 to a pressure in excess of that in compartment 128.

A coil compression spring 120 is provided seated between the portion 92 of housing 88 and a portion 124 on the inner side of the secondary flange member 108 so as to bias the plunger 86 to its uppermost position with flange 100 abutting side 90 of the housing.

Initial movement of plunger 86 downwardly by means of lever 76, as seen in Figure 1, causes diaphragm portion 118 to be seated against the peripheral portions of primary flange 102, permitting the communication of air between chambers 126 and 128 only by way of the orifice 106. Further movement of the plunger in this direction reduces the pressure greatly in compartment 126 thereby retarding the movement of the plunger, the rate of movement being determined by the rate of leakage of the air through orifice 106. Return movement of the plunger 86 by release of the lever 76 and by the bias of spring 120 will cause diaphragm portions 118 to be forced against the outer peripheral portions 110 of secondary flange 108 by the greater pressure in compartment 126 relative to the pressure in compartment 128 thereby creating a space 129 between portions 118 of the flexible diaphragm and the peripheral portions of primary flange 102, to permit unrestricted communication of air between chambers 126 and 128, thus by-passing the orifice 106 and permitting a quick return of the plunger to its initial position.

The fluid source for supplying the dash-pot chamber 95 with fluid under pressure consists of, as seen in Figures 1 and 2, a collapsible rubber-like balloon or container 130 of irregular configuration adapted to be connected at one end 132 to a portion of the valve casing. This container 130 comprises a bag 133 having rubber-like walls 134 sealed except for an opening formed by a nipple 136 having a fluid conduit 138 formed therein. The housing 88 of the dash-pot is formed at one portion with extended flanges 146 and 148, the flange 148 having an annular tapered opening 150 to forcibly engage a conduit member 154 suitably positioned in the bore 138 of nipple 136 for connecting chamber 95 and the fluid chamber 135 defined by the confines of the bag 133. The connecting conduit 154 is held in place against the nipple 136 by the pre-sprung tapered portion 150.

Bag walls 134 and nipple 136 are suitably supported in the horizontal direction by means of thin metal supporting means 140 abutting the side portions of the casing at 142 for sliding movement and engaging the nipple at 144. Housing 88 of the dash-pot is formed at its upper end with a lug 156 having an opening 158 adapted to slidably receive a pin 160 journalled in the bore 162 provided in the housing 12 of the valve mechanism.

The collapsible chamber or balloon 130 is initially adapted to be filled with purified air at atmospheric pressure. When the valve becomes subject to the operating pressure of the system, the bag 133 collapses until this pressure is arrived at in the interior 135 of the bag. Thus the pressure in chamber 95 of the dash-pot will be equal to that of the pressure in bag 133 because of the connecting means 154 permitting free passage of air therethrough with portion 150 of the dash-pot housing and portion 154 of the connecting means providing a seal preventing the escape of air from chamber 130 or dash-pot chamber 95 into the valve controlling chamber 16. Since the bag 133 is collapsible, and the air in chamber 16 acts on the walls of the bag, any increase in pressure in chamber 16 because of supply of air through the intake valve 52 from the high pressure source will cause the walls of the bag to be compressed, thereby increasing the pressure in the bag 133 and consequently chamber 95 of the dash-pot until an equilibrium is established whereby the two pressures, that of the fluid in chamber 16 and in chamber 95 will be equal. This will prevent the leakage of air from chamber 16, which may have oil vapor present therein, into the dash-pot chamber 101, thereby preventing the contamination of the air in the dash-pot chamber.

*Operation*

Upon suitable displacement of the sprung mass from the unsprung mass of the vehicle causing rotation of lever 36 thereby actuating lever 72 through linkage 68, lever 72 will attempt to move downwardly to pull plunger 86 in a corresponding direction against the bias of spring 120 to move primary flange 102 downwardly against flexible diaphragm portions 118. As described previously, since the air in chamber 128 can only escape into chamber 126 through the orifice 106, the plunger will be retarded in its movement in this direction thereby retarding rotation of lever 36 to retard actuation of the air intake valve 52, thereby preventing opening of the valve at this time. Upon a sustained tendency of secondary lever 36 to rotate thereby impressing a force on lever 72 to continue pulling the plunger 86 downwardly, a point will be reached during the downward movement of plunger 86 when lever 36 will have rotated sufficiently to move flange 50 against the stem 51 of the intake valve 52 to open the intake valve thereby supplying air from the high pressure source to the air springs through the conduit 18. If the lever 36 should suddenly be shifted back to its normal position, as shown in Figure 1, and as would be the case when the vehicle has negotiated a turn and is entering a straight portion of the road, lever 72 will then be moved through its return stroke by link 68 in an upward direction as seen in Figure 1 permitting spring 120 to move plunger 86 upwardly without any retarding effect by the orifice 106. This is accomplished due to the fact that as flange 108 moves upwardly, greater pressure of the fluid in compartment 126 relative to the pressure in compartment 128 moves diaphragm 114 until portion 118 abuts flange outer portion 110, permitting fluid to pass readily through now opened passage 129, space 116, and holes 112 to compartment 128, thereby by-passing the restricted orifice 106.

With the increase in pressure in chamber 16 due to the presence of a higher air pressure from the compressor being admitted through the open intake valve 52, collapsible bag 130, which is under a lower pressure, will be compressed to increase the pressure therein and thereby the air in dash-pot chamber 95 until a point is reached in the reduction in size of the bag where the pressure in the chambers 135 and 95 will equal the pressure in chamber 16. Since there is no differential in pressure between chambers 95 and 16, there is no pressure available to force any of the vapor mist present in the fluid in chamber 16 into chamber 95 by way of leakage.

From the foregoing it will be seen that applicant has provided a dash-pot fluid supply system having its own air supply that is free of materials that might contaminate the diaphragm orifice, thereby providing a trouble-free dash-pot operating mechanism. It will also be seen that applicant has provided a closed fluid dash-pot system whereby the pressures within the dash-pot and outside the same will at all times be equal to prevent leakage of the fluid outside the chamber containing harmful materials into the dash-pot operating chamber. It will be understood that the invention can be modified beyond the illustrated embodiments, and therefore, any limitations to be imposed are those set forth in the following claims.

I claim:

1. A fluid dash-pot operating mechanism comprising a housing having a chamber therein adapted to be supplied with fluid, a flexible diaphragm within said chamber and attached to said housing, said housing having an aperture on one side thereof, a slidable shaft positioned within said aperture and having an end extending adjacent the opposite side of said housing, said end having an annular fixed flange thereon, orifice means within said flange, said end having fixed thereon a second annular flange, the outer peripheral portions of said second flange being spaced from said first flange, said flexible diaphragm being positioned between the outer peripheral portions of said flanges, said flanges and said diaphragm dividing said chamber into separate compartments, said orifice providing communication between the compartments during one phase of sliding movement of the shaft, communication between said compartments during another phase of operation of the shaft being provided by the passing of fluid between said diaphragm and first flange by-passing said orifice.

2. A fluid dash-pot comprising a housing having a chamber therein adapted to be supplied with fluid, said housing having an aperture on one side thereof, a slidable plunger positioned within said aperture and having one end extending adjacent the opposite side of said housing, said end having a pair of annular flange members fixed thereto, a flexible diaphragm surrounding said plunger and fixed to said housing, said diaphragm being positioned between said flanges in abutting relation with one and axially spaced relation with the other, said flanges and diaphragm cooperating to divide said chamber into two compartments, and orifice means attached to one of said flanges cooperating with said diaphragm and the other of said flanges and communicating with the fluid in both compartments, means for moving said plunger, and spring means positioned between one of said flanges and said housing, said orifice retarding the movement of fluid between said compartments upon the movement of said plunger in one direction by the seating of said diaphragm against one of said flanges, the unretarded movement of said plunger in the other direction by means of said spring means being permitted by the seating of said diaphragm against the other of said flanges.

3. A dash-pot as in claim 2, wherein there is provided a source of fluid pressure for said chamber, said source comprising a collapsible bag containing a fluid under pressure, and connecting means between said chamber and said bag for communicating the pressure in said bag to said chamber, force means acting on said bag to collapse the same, said chamber source and connecting means forming a closed fluid system, said bag being collapsible under said force means to produce a pressure in said chamber equal to the pressure of said force means.

4. A dash-pot controlling mechanism comprising a dash-pot, a housing for said dash-pot having a chamber therein adapted to be supplied with fluid under pressure, said housing having an aperture on one side, a movable plunger positioned within said aperture and having an end extending to the opposite side of said housing, a flexible diaphragm attached to said housing and surrounding said plunger, said diaphragm dividing said housing into two compartments, and orifice means between said plunger and said diaphragm for retarding the movement of fluid between said compartments upon movement of the plunger in one direction while permitting unretarded communication of fluid between said compartments upon movement of the plunger in the opposite direction, a source of fluid pressure for said chamber, and connecting means between said source and said chamber, said source comprising a container filled with a fluid under pressure and having deformable walls, fluid pressure means acting on said walls to deform the same, deformation of said walls producing a pressure in said chamber corresponding to the pressure against said walls.

5. A dash-pot comprising a housing having a chamber therein adapted to be filled with fluid under pressure, said housing having an opening in one wall thereof, a movable plunger positioned within said opening and extending to the opposite side of said housing, a first flange member attached to said plunger, a second flange member fixed to said plunger adjacent said first flange, said flanges having diaphragm overlapping portions which are axially spaced a distance greater than the thickness of the diaphragm, said first and second flanges and diaphragm cooperating to divide said chamber into two fluid compartments, orifice means fixed to said first flange member, and spring means positioned between said housing and said flange member for biasing said plunger in one direction, means for moving said plunger, movement of said plunger in one direction seating said diaphragm against said first flange member permitting a controlled communication of fluid between said chambers through said orifice means, movement of said plunger in said other direction by said spring means seating said diaphragm against said second flange member permitting the unrestricted communication of fluid between said compartments by-passing said orifice means thereby permitting unretarded movement of said plunger in said other direction.

References Cited in the file of this patent

UNITED STATES PATENTS

| Re. 23,437 | Mercier | Dec. 4, 1951 |
| 1,538,420 | Church | May 19, 1925 |
| 2,361,575 | Thompson | Oct. 31, 1944 |
| 2,696,980 | Goodwin | Dec. 14, 1954 |

FOREIGN PATENTS

| 1,076,192 | France | Apr. 21, 1954 |